US007877335B2

(12) United States Patent
Madani (10) Patent No.: US 7,877,335 B2
(45) Date of Patent: Jan. 25, 2011

(54) SYSTEM AND METHOD FOR LEARNING A NETWORK OF CATEGORIES USING PREDICTION

(75) Inventor: Omid Madani, San Gabriel, CA (US)

(73) Assignee: Yahoo! Inc., Sunnyvale, CA (US)

( * ) Notice: Subject to any disclaimer, the term of this patent is extended or adjusted under 35 U.S.C. 154(b) by 594 days.

(21) Appl. No.: 11/975,483

(22) Filed: Oct. 18, 2007

(65) Prior Publication Data

US 2009/0106022 A1 Apr. 23, 2009

(51) Int. Cl.
*G06F 15/18* (2006.01)
(52) U.S. Cl. ...................................... 706/12
(58) Field of Classification Search ............... 706/12, 706/14
See application file for complete search history.

(56) References Cited

U.S. PATENT DOCUMENTS

| 7,788,248 | B2 * | 8/2010 | Forstall et al. ............... 707/706 |
| 2006/0179074 | A1 * | 8/2006 | Martin et al. ................ 707/102 |
| 2008/0243736 | A1 * | 10/2008 | Rieman et al. ................ 706/18 |

OTHER PUBLICATIONS

M.F. Caropreso, S. Matwin, and F. Sebastiani, "A Learner-Independent Evaluation of the Usefulness of Statistical Phrases for Automated Text Categorization", Text Databases and Document Management: Theory and Practice, A.G. Chin, ed., Idea Group Publishing, Hershey, PA, pp. 78-102, 2001.*

Fabrizio Sebastiani, "Machine Learning in Automated Text Categorization", ACM Computing Surveys, vol. 34, No. 1, Mar. 2002, pp. 1-47.*
Jianzeng Wang et al., "Using Fuzzy Cognitive Map to Effectively Classify E-Documents and Application", GCC 2005, LNCS 3795, pp. 591-596, 2005.*
Aguilar (Jose Aguilar, "A Survey about Fuzzy Cognitive Maps Papers", Int'l Journal of Comp. Cognition vol. 3, No. 2, Jun. 2005) discusses FCMs.*
Honkela et al. (Timo Honkela et al., "WEBSOME—Self-Organizing Maps of Document Collections", Proceedings of WSOM, 1997, pp. 1-6) discuss SOMs as applied to document classification.*

(Continued)

*Primary Examiner*—Michael B. Holmes
*Assistant Examiner*—Vincent M Gonzales
(74) *Attorney, Agent, or Firm*—Law Office of Robert O. Bolan (57) ABSTRACT

An improved system and method is provided for efficiently learning a network of categories using prediction. A learning engine may receive a stream of characters and incrementally segment the stream of characters beginning with individual characters into larger and larger categories. To do so, a prediction engine may be provided for predicting a target category from the stream of characters using one or more context categories. Upon predicting the target category, the edges of the network of categories may be updated. A category composer may also be provided for composing a new category from existing categories in the network of categories, and a new category composed may then be added to the network of categories. Advantageously, iterative episodes of prediction and learning of categories for large scale applications may result in hundreds of thousands of categories connected by millions of prediction edges.

21 Claims, 5 Drawing Sheets

OTHER PUBLICATIONS

Lin et al. (Xia Lin, Dagobert Soergel, and Gary Marchionini, "A Self-organizing Semantic Map for Information Retrieval", Research and Development in Information Research, Annual ACM Conference on, 1991, pp. 262-69) disclose a self-organizing semantic map.*

Ritter et al. (H. Ritter and T. Kohonen, Self-Organizing Semantic Maps) discuss the title subject.*

J. Bhogal, A. Macfarlane, and P. Smith "A review of ontology based query expansion", Information Processing and Management 43 (2007) 866-86, available online Oct. 23, 2006.*

J. T. Goodman, A Bit of Progress in Language Modeling, Computer Speech and Language, 15(4):403-434, Oct. 2001.

J. Z. Wang, J. Li, and G. Wiederhold, SIMPLIcity: Semantics-sensitive Integrated Matching for Picture Libraries, IEEE Transactions on Pattern Analysis and Machine Intelligence.

R. Rosenfeld, Two Decades of Statistical Language Modeling: Where Do We Go From Here, IEEE, 88(8), 2000.

Y. Even-Zohar and D. Roth, A Classification Approach to Word Prediction, In Annual meeting of the North American Association of Computational Linguistics (NAACL), 2000.

* cited by examiner

SYSTEM AND METHOD FOR LEARNING A NETWORK OF CATEGORIES USING PREDICTION

FIELD OF THE INVENTION

The invention relates generally to computer systems, and more particularly to an improved system and method for efficiently learning a network of categories using prediction.

BACKGROUND OF THE INVENTION

Decades of research in cognitive psychology has stressed the importance of categories, or concepts, to basic cognition. See for example, G. L. Murphy, *The Big Book of Concepts*, MIT Press, 2002. In the field of machine learning also, the task of predicting or classification is central. Moreover, the number of categories necessary for general human-level intelligence can easily exceed millions. It is likely that humans and higher animals acquire much of these categories or concepts on their own, via much experience and learning. Therefore, developing systems and methods that can learn many complex inter-related categories, in the millions and beyond, primarily on their own, would be very useful. This abundance of concepts, if effectively learned, has the potential to allow the system to make many useful distinctions in its lifetime, by repeatedly classifying input scenarios into appropriate categories and taking appropriate actions. Such flexibility of efficiently handling many categories is a necessity for sophisticated intelligence.

What is needed is a system and method that may learn many complex inter-related categories, in the millions and beyond, that may allow for making the required distinctions necessary for sophisticated intelligence.

SUMMARY OF THE INVENTION

Briefly, the present invention provides a system and method for efficiently learning a network of categories using prediction. A learning engine may be provided for learning a network of categories from a stream of characters by efficiently using prediction, and a prediction engine may be provided for predicting a target category from the stream of characters using one or more context categories. In an embodiment for learning a network of categories using prediction, the learning engine may receive a stream of characters and incrementally segment the stream of characters beginning with individual characters into larger and larger categories. To do so, a target category may be determined from the stream of characters and predicted using one or more context categories. In various embodiments, the target category may be predicted using effectively an index. The index may map context categories to categories. The index may be used to retrieve and score a set of candidate categories and to select the top-scoring category from the set of candidate categories. The edges of the index may represent the edges of a network of categories that may be updated by increasing the weight of one or more edges to the target category in the network of categories, by decreasing the weight of one or more edges to the target category in the network of categories, or by adding or removing an edge to the target category in the network of categories.

A category composer may also be provided for creating a new category from existing categories in the network of categories. In general, category composition may also occur online and may occur independently of the updates for prediction. In an embodiment, composition statistics, such as occurrence counts for categories that are candidates for composition, may be updated, and it may be determined whether a new category should be composed out of existing categories. In various embodiments, a score may be calculated using composition statistics and compared to a threshold to determine whether to concatenate the one or more context categories with one another or the target category to compose the new category. A new category composed may then be added to the network of categories.

The present invention may support many applications for efficiently learning a network of categories using prediction. For instance, a text editing application may use the present invention for word prediction, word suggestion or word correction. Or the present invention may be used in applications for text generation and compression. The iterative episodes of prediction and learning of categories is especially useful for large scale applications, for example, with hundreds of thousands of categories connected by millions of prediction edges.

Other advantages will become apparent from the following detailed description when taken in conjunction with the drawings, in which:

DETAILED DESCRIPTION

Exemplary Operating Environment

Figure 1:
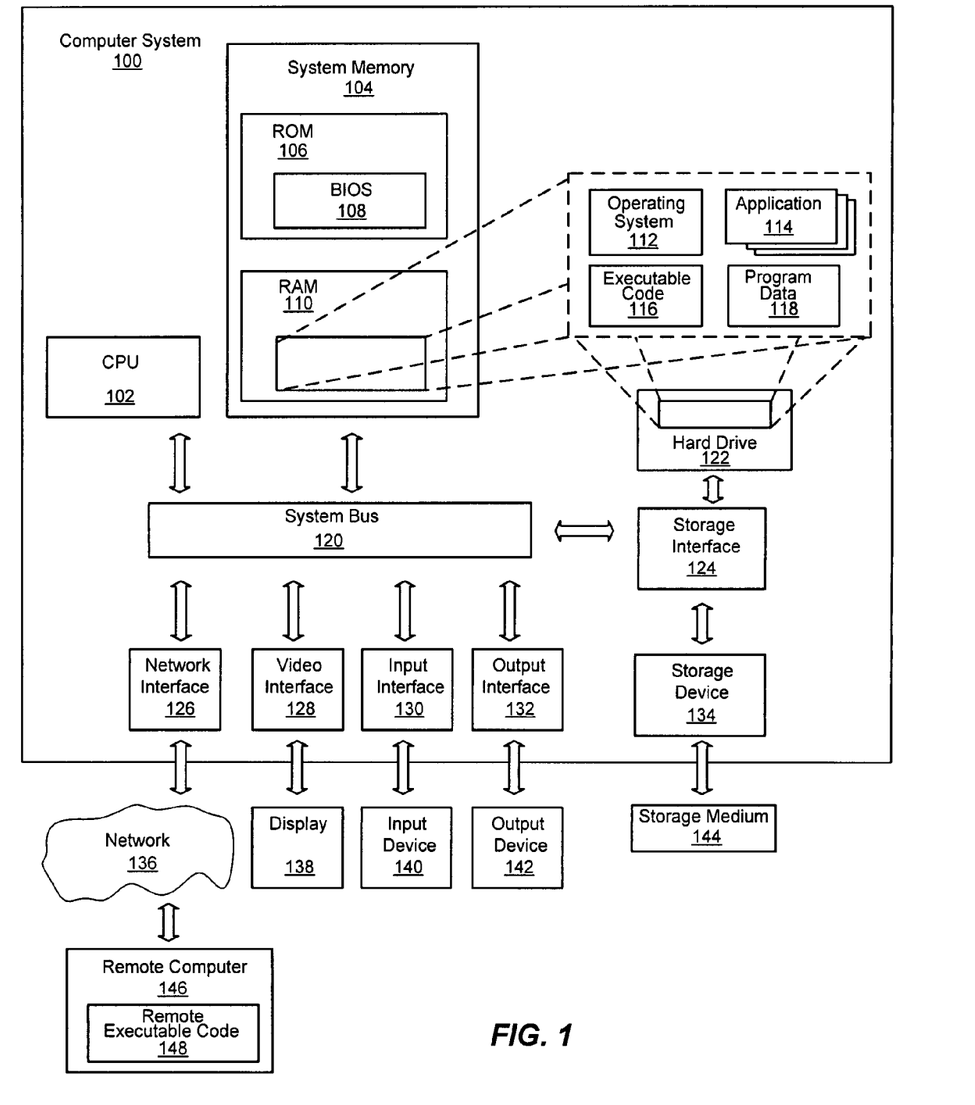
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, non-volatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Learning a Network of Categories Using Prediction

The present invention is generally directed towards a system and method for efficiently learning a network of categories using prediction. Given a stream of characters from a rich source such as web pages, the system and method engages in repeated prediction and learning of a network of categories. As the system and method predicts and learns, it may add, remove, and update connection weights and category nodes of the network of categories. Over time, the system and method learns to predict better and acquires new useful categories.

As will be seen, learning a network of categories may be applied by many large scale applications for learning and classifying hundreds of thousands of categories. As will be understood, the various block diagrams, flow charts and scenarios described herein are only examples, and there are many other scenarios to which the present invention will apply.

Figure 2:
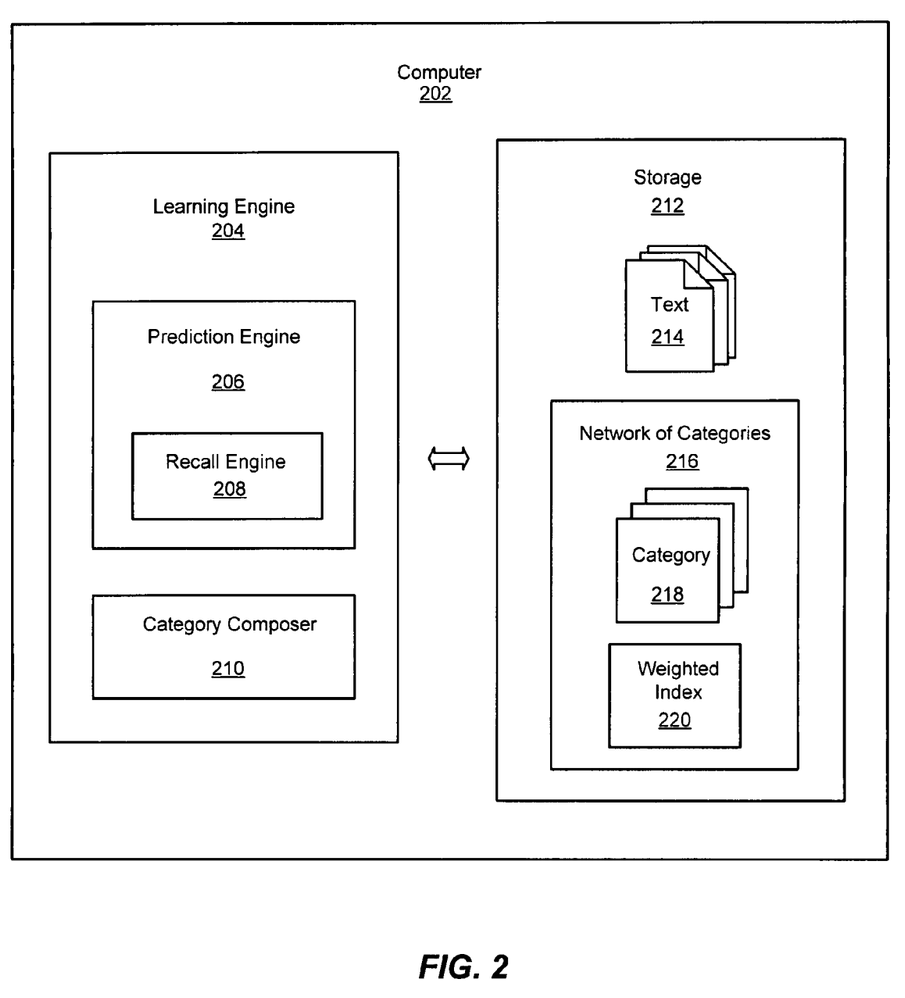
FIG. 2 is a block diagram generally representing an exemplary architecture of system components for efficiently learning a network of categories using prediction, in accordance with an aspect of the present invention.

Turning to FIG. 2 of the drawings, there is shown a block diagram generally representing an exemplary architecture of system components for efficiently learning a network of categories using prediction. Those skilled in the art will appreciate that the functionality implemented within the blocks illustrated in the diagram may be implemented as separate components or the functionality of several or all of the blocks may be implemented within a single component. For example, the functionality for the category composer 210 may be included in the same component as the prediction engine 206. Or the functionality of the recall engine 208 may be implemented as a separate component from the prediction engine 206.

In various embodiments, a computer 202, such as computer system 100 of FIG. 1, may include a learning engine 204 operably coupled to storage 212. In general, the learning engine 204 may be any type of executable software code such as a kernel component, an application program, a linked library, an object with methods, and so forth. The storage 212 may be any type of computer-readable media and may store text 214, and a network of categories 216 that may include a set of categories 218 connected by edges stored in a weighted index 220 mapping categories to categories.

The learning engine 204 may learn a network of categories from text by efficiently using prediction to create a weighted index of prediction edges mapping categories to categories. The learning engine 204 may include a prediction engine 206 for predicting a target category in a network of categories using one or more context categories and a category composer 210 for creating a new category from existing categories in the network of categories. The prediction engine 206 may include a recall engine 208 for providing a ranked recall of a target category indexed by context categories. Each of these modules may also be any type of executable software code such as a kernel component, an application program, a linked library, an object with methods, or other type of executable software code. The learning engine 204 may learn the network of categories by dynamically updating weights of some edges of the network of categories and dynamically creating new categories as a stream of characters may be incrementally processed.

In general, a stream of characters, for example from the news articles or pages on the web, can be input to the system. No preprocessing, including segmentation or tokenization is necessary, although such preprocessing may be useful. At a high level, the system and method performs two related learning tasks: prediction and composition. In every episode, a target category is treated as unknown, and the categories appearing in its context, the active categories or predictors are used to predict it. Then appropriate prediction edges are updated, including some edges being added or dropped, and relevant composition statistics are updated. A new category, which may be composed of two previous categories, may be added to the system and assigned the next available ID for a category.

In an embodiment, efficiently learning a network of categories using prediction may generally be implemented by the following algorithm:

Algorithm LearningCategories
Repeat
 1. Move window one category to the right
 2. Update the context vector and the target category
 3. Predict using the context vector and update the system based on the outcome.

In this embodiment, the algorithm may begin at the level of predicting single characters where characters form the context and targets. For example, if the stream of characters input into the system for processing may be "New York Mets game . . . ", then the window may be moved one character to the right; and the character "e" is the target, and the character "N", at position −1 before target, and the character "w", at position +1, are the active categories or predictors comprising the context. In various embodiments, the context can include several categories or may be limited to one side of the target. After each learning episode, the window identifying the context categories and the target category moves right to incorporate the next category. The next target category in the stream of characters in the example is "w". As the learning process continues, categories formed by longer strings, such as "New" may be acquired, and the context may be composed of categories formed by longer strings also. The stream of characters may be segmented into categories incrementally, using the currently largest category that matches. For instance, when processing the stream of characters, "New York Mets game . . . ", if "New York" may already be an acquired category, but not "New York Mets", then "New York" may be the target category that is picked, when the window is moved right, instead of "N" or "New". And the category "New York" may be used as well as the context for previous or subsequent categories. In an embodiment, the function of finding the longest category may be implemented efficiently via a trie data structure.

In various embodiments, the categories learned may be represented by a network of categories. For instance, each category may be represented as a node in a sparse directed weighted graph. While there can be millions of categories, each category may connect to a tiny fraction of other categories, resulting in a sparse graph. Each node may have zero or more out-edges, connecting to categories that it predicts well. Edges may be weighted and edges may be grouped by the position of the category in the context. For example, the edge corresponding to position −1 preceding the target category may be different from the edge corresponding to position −2 before or position 1 after the target category, even if they all connect to and predict the same category. Edges that may belong to the same group, or same position, may be updated together. Furthermore, a short list of candidate categories may be kept and updated with each category for use in composition of a new category.

Figure 3:
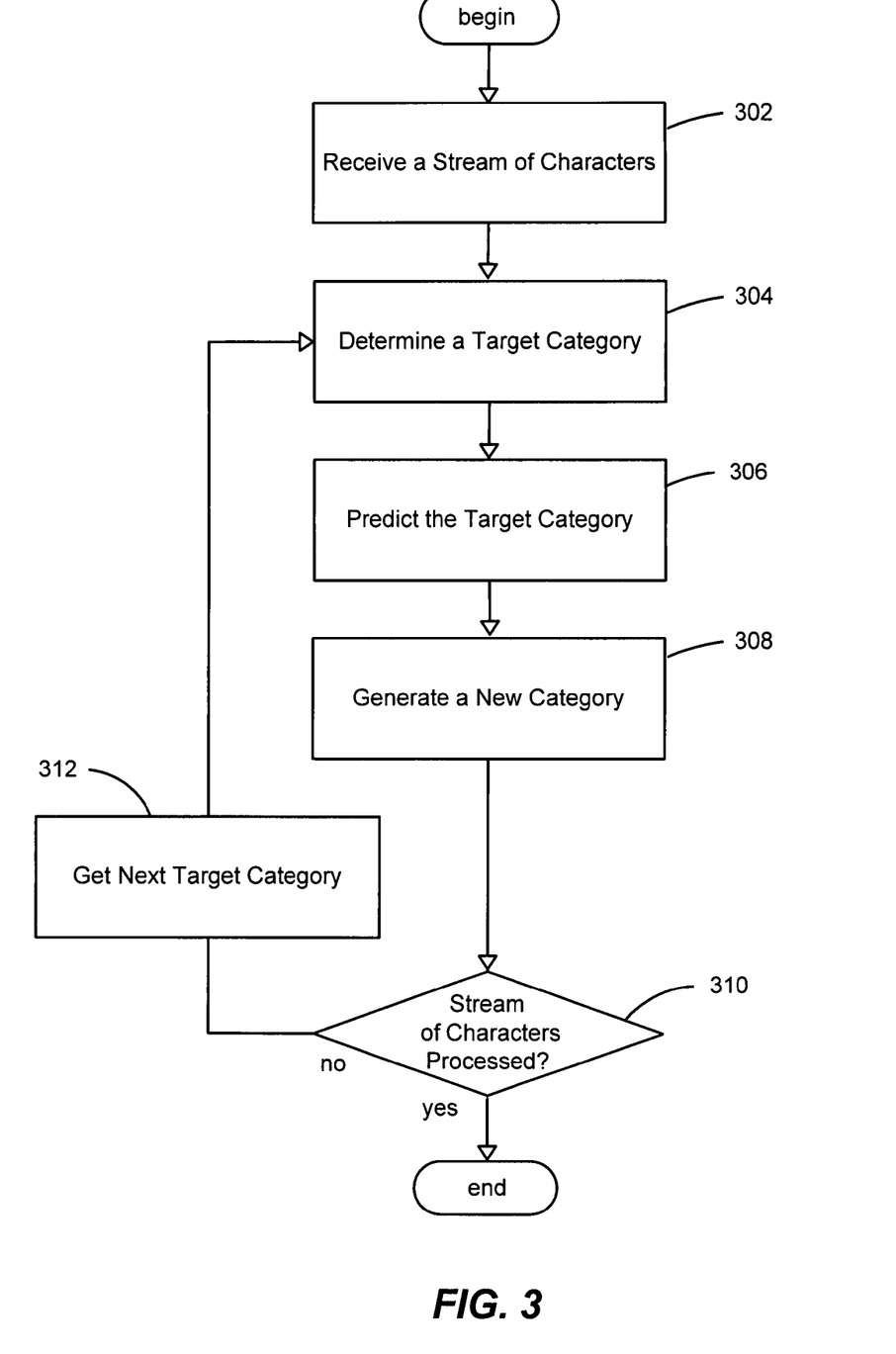
FIG. 3 is a flowchart generally representing the steps undertaken in one embodiment for efficiently learning a network of categories using prediction, in accordance with an aspect of the present invention.

FIG. 3 presents a flowchart generally representing the steps undertaken in one embodiment for efficiently learning a network of categories using prediction. At step 302, a stream of characters may be received. In general, the stream may be segmented into categories incrementally, using the currently largest category that can be matched. To do so, a target category may be determined at step 304 from the stream of characters. In the beginning, categories may be initially predicted in an embodiment at the individual character level—at the level of predicting single characters. Both the target category and the context categories may be represented by single characters. Over time, target categories formed by larger strings may be predicted using context categories represented by larger strings. To determine a target category, the largest string that can be identified in an embodiment may be used.

At step 306, the category of the target category may be predicted. In an embodiment, the category of the target category may be predicted using a ranked recall of the target category from context categories, which is described in below in conjunction with step 406 of FIG. 4. At step 308, a new category may be generated. In an embodiment, a new category may be composed by the concatenation of two categories where a threshold may be met. At step 310, it may be determined whether the stream of characters received has been processed. If so, then processing may be finished. If not, then the next target may be determined at step 304 and processing may continue.

Figure 4:
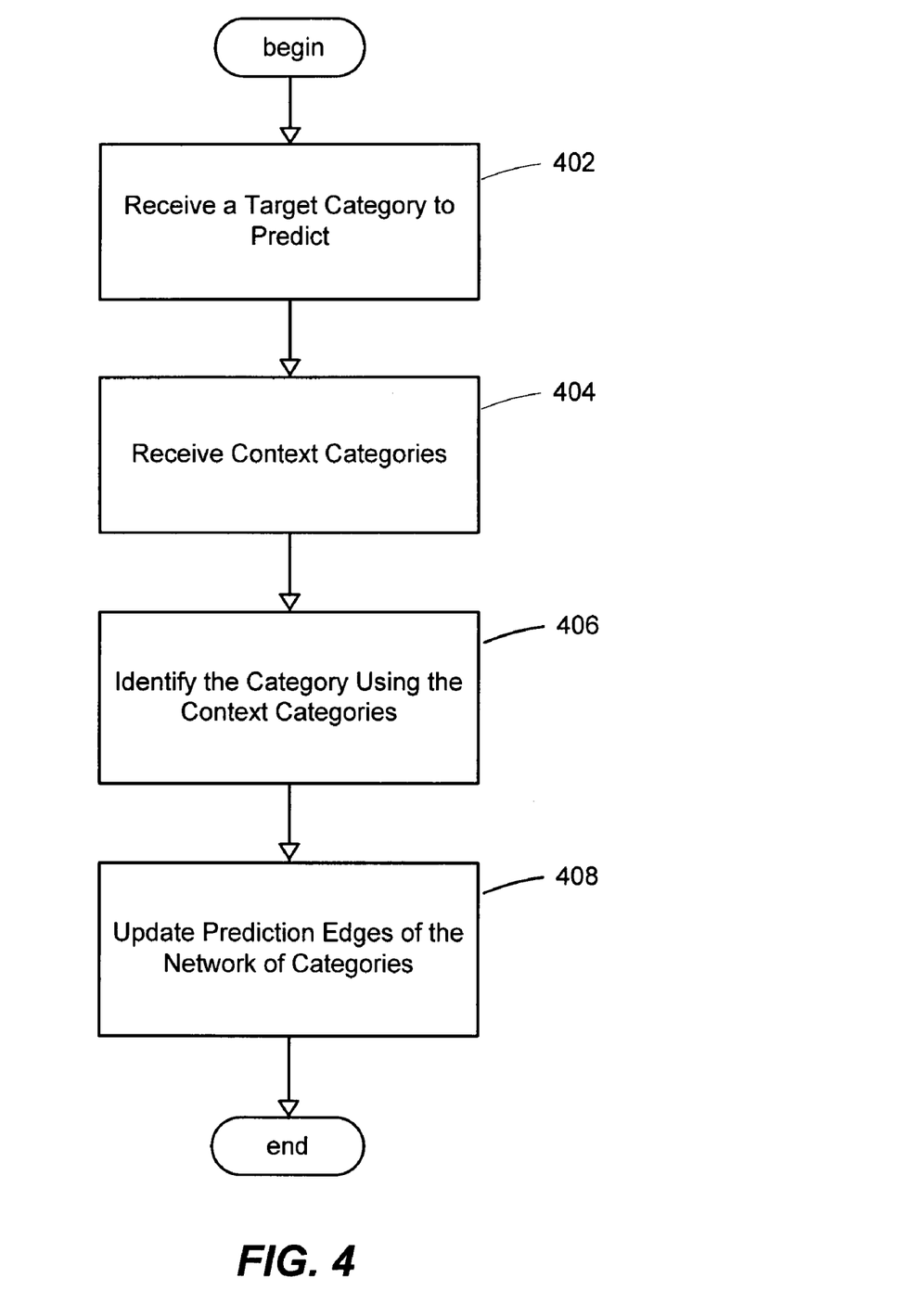
FIG. 4 is a flowchart generally representing the steps undertaken in an embodiment for predicting a target category, in accordance with an aspect of the present invention.

FIG. 4 presents a flowchart generally representing the steps undertaken in an embodiment for predicting a target category. At step 402, a target category to be predicted may be received, and context categories may be received at step 404. In an embodiment, one or more context categories may be received. At step 406, the target category may be predicted using the context categories. In an embodiment, the target category may be identified by using ranked recall to index the target category by the context categories, and the top-ranked category may be selected to predict the target category.

In particular, ranked recall may work as follows. The out-edges in the appropriate position for each context category become active for prediction during recall. These edges may be used to score candidate categories. The score of a candidate category may be simply the sum of the weights of its incoming active edges. For instance, given the context category "New", at position −1 (the context category to the left of the target category), consider this context category to have only two out-edges: one out-edge may be assigned a score of 0.1 which connects to the category "York", and the other out-edge may be assigned a score of 0.07 which connects to "Jersey". Also consider the context category "Nets" is at position +1 (the context category to the right of the target category) and assume it may be assigned a value of 0.05 to Jersey ("New Jersey Nets" is a professional team). Thus, the candidate category "Jersey" obtains a higher score of 0.05+0.07 than the candidate category "York" with a score of 0.1. The prediction of the system is the top-ranked category with the highest received score. If the top-ranked category is the target category, then the system obtains a reward equal to the target string length, otherwise the system may obtain a 0 reward for the target category. The system seeks to improve the average reward it obtains per prediction action. Additional details about using ranked recall to index candidate categories to be retrieved and ranked can be found in related copending U.S. patent application Ser. No. 11/648,323, entitled "SYSTEM AND METHOD FOR LEARNING A WEIGHTED INDEX TO CATEGORIZE OBJECTS," assigned to the assignee of the present invention.

After the target category may be predicted, the prediction edges of the network of categories may be updated at step 408 and processing may be finished for predicting a target category. In an embodiment, updating the prediction edges of the network of categories may generally be implemented by the following algorithm:

Algorithm UpdatePredictionEdges
For each predictor (context category)
1. Update its predictiveness rating
2. Increase the weight of the edge to the target category
3. Decrease weights for edges in the same position to the target category
4. Drop edge weights below a threshold.

In this embodiment, the general steps include strengthening the weight of the edge connecting the context (predictor) category to the target by adding an amount to the weight of the edge and weakening other edge weights in the same group. If there is not an edge present, the edge is added connecting the context category to the target category. Thus, the target category now gets a higher score by each individual context category, and if a similar context occurs, the target category may be ranked higher.

In an embodiment, the weights may have an upper bound of 1.0 and a lower bounded of zero. Note that a fixed range may be important for long term learning, so that the weights do not increase or decrease without bound. Edges with weight lower than a threshold, such as 0.01 in an embodiment, may be removed. This can become very important for limiting memory consumption. Generally, edge groups have finite-memory: a new connection can quickly gain enough weight to beat the currently highest weight connection. The weights do not have precise probabilistic semantics: they are adjusted to improve ranking performance. Categories may begin with no edges (i.e., implicitly 0 weights). Note that not every learning episode may involve an update to prediction weights. For instance, if the target category received a score significantly greater than the closest contender of the context categories, then there may be no update in an embodiment.

In various embodiments, keeping and updating a rating for each category may be very useful for online long-term learning. The rating may represent a measure of how good the category is for prediction. When the category first appears, its rating may be initialized to 1.0. There may be a different rating for each of a category's positions. The rating may be adjusted by increasing or decreasing the rating in each learning episode where the category is a context category, based on how the category scored the target category, compared to the average score the target category received from all the context categories. The rating may be used to adjust the score the category assigns to its predictions, as well as adjust allowance for the number of categories it may predict. Over time, uninformative categories may obtain low ratings, while better than average categories may obtain high ratings. This mechanism improves both accuracy and speed since uninformative categories that may appear very frequently may get low ratings, and thus few prediction edges. Consequently, such uninformative categories may be processed quickly.

Subject to efficiency constraints, it is beneficial to produce good categories in order to maximize prediction accuracy on unseen data. In general, good categories may include those that are predicted well and that help in prediction. The longer the category, if predicted well, the higher the prediction performance may be. Longer categories can also help define the context better. There is a tradeoff, however, between the length of categories and learning sample size. Longer categories require more bits of training, since longer categories simply take more bits to specify in the input, and the number of possible unique categories grows with category length. It is also possible that longer categories may be inherently more complex. For instance, a randomly picked category of length 4 (four characters) in an embodiment, may require on the order of a 1000 learning episodes on average in which it's a target subject to be predicted well, such as within 95% of the maximum achievable accuracy. Whereas, a category of length 1 may require on the order of 100 learning episodes.

Figure 5:
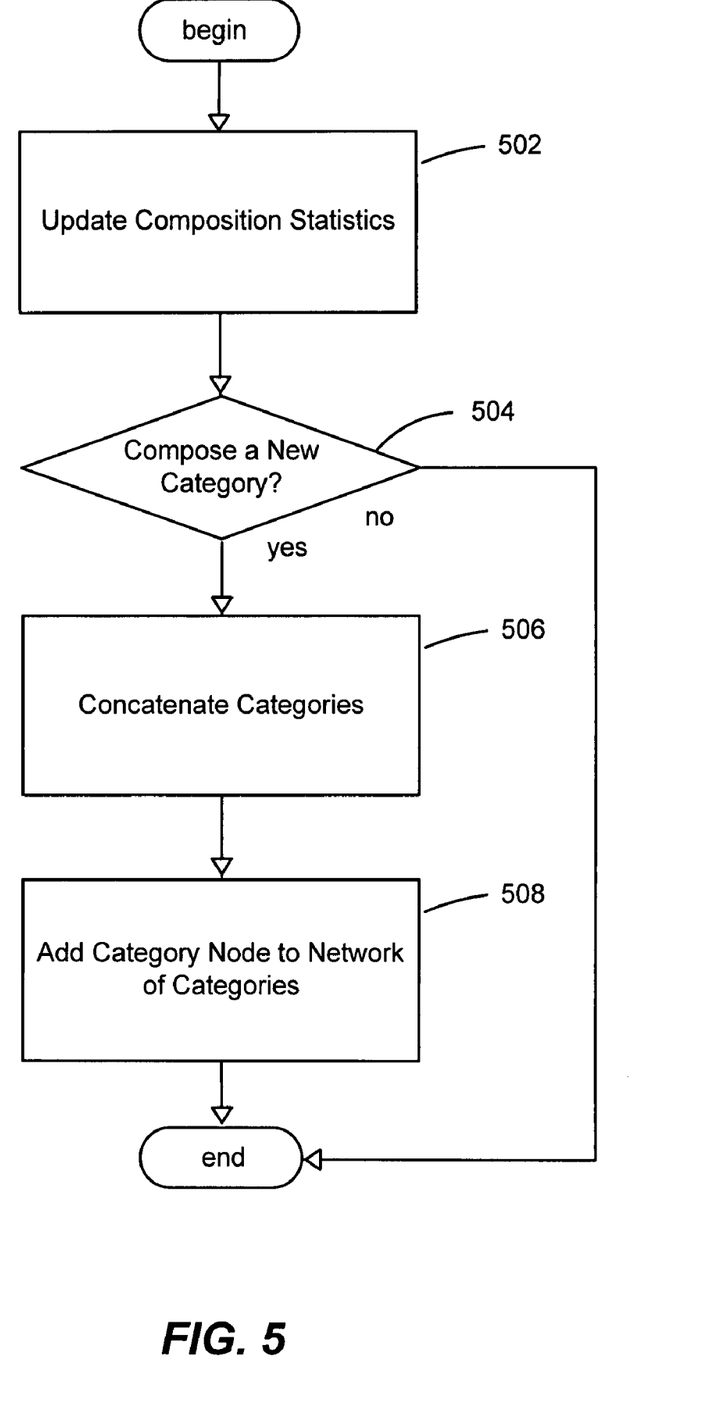
FIG. 5 is a flowchart generally representing the steps undertaken in one embodiment for generating a new category, in accordance with an aspect of the present invention.

FIG. 5 presents a flowchart generally representing the steps undertaken in one embodiment for generating a new category. At step 502, composition statistics may be updated, and it may be determined at step 504 whether a new category should be composed. For instance, $c_2$ may represent the target category to be predicted and $c_1$ may be a context category appearing in position −1 which is immediately before the target category. In various embodiments, different pre-filtering criteria may be employed to decide whether a new category, $c_1c_2$, should be composed. A pre-filtering criterion may evaluate a category before the category is treated as a normal category and used for prediction. For example, to avoid combinatorial increase of considering all possibilities, methods may be employed that only consider candidate categories that have appeared in the input stream at least once. This is a simple form of pre-filtering. There may be various other embodiments described that may extend this simple filter.

In an embodiment, each category in the network of categories may have an associated list of candidate categories for composition. Each time a category $c_1$ is seen in position −1, it may increment an occurrence count for each of the categories in its list of candidates. For the target category $c_2$, the co-occurrence count may also be incremented. If the occurrence count may reach a threshold for any category node, the occurrence and co-occurrence counts may then be used to obtain an estimate of the conditional probability p where $p=P(c_2|c_1)$. The threshold for using occurrence and co-occurrence counts to estimate the conditional probability may be set to 50 or 100 for instance in an embodiment. This conditional probability may then be used to evaluate a criterion that if satisfied, the category $c_1c_2$ may be composed and added to the set of acquired categories. In any case, the node for $c_2$ may be removed from the list of candidate considerations for $c_1$ to keep the list size from growing unnecessarily.

In an embodiment, a new category, $c_1c_2$, may be composed if the probability $P(c_2|c_1)$, where $P(c_2|c_1)$ denotes the conditional probability that $c_2$ appears after $c_1$, may exceed a threshold $p_f$. In various embodiments, the threshold may be set to one, $p_f=1$, and the method may not generate categories with length exceeding a second threshold $l_t$, which may be set to 10 for instance.

In another embodiment, a new category, $c_1c_2$, may be composed if both $c_1$ and $c_2$ have certain minimum frequencies, such as 20 in an embodiment, and an estimate of the conditional probability $$\frac{P(c_2 \mid c_1)}{P(c_2)}$$

may exceed a threshold that may be set to 3 or 4 for instance. This embodiment may use the point-wise mutual information between $c_1$ and $c_2$:

$$\frac{P(c_2 \mid c_1)}{P(c_2)} \text{ where } P(c_2 \mid c_1)$$

denotes the conditional probability that $c_2$ appears after $c_1$. These probabilities can be computed efficiently online using the occurrence counts for each of the categories in the list of candidate categories for composition. However, the probabilities used for this method may not take the drift in category co-locations into account. For example, after the category "New York" is picked as a new category, the category "New Jersey" should then be next, but it may take a while for the ratio $$\frac{P(c_2 \mid c_1)}{P(c_2)}$$

to reflect this.

In yet a third embodiment, a new category, $c_1c_2$, may be composed if the following inequality may be satisfied, $$p(l_1 + l_2) - \frac{l_1 + pl_2}{2} \geq t_l,$$

for a threshold $t_l$, which may be set for example to −3 in an embodiment. This method may check whether adding the category may improve prediction and may also take length of a category into account. Consider the length of the category, denoted by $l_i$, to be set to the string length where $1_i=|c_i|$, and the probability p set to the conditional probability, $p=P(c_2|c_1)$, where $P(c_2|c_1)$ denotes the conditional probability that $c_2$ appears after $c_1$. This criterion may generally be considered to compare whether it is better to predict $c_1$ alone or to have the option of predicting $c_1c_2$ together. For instance, when $c_1$ is about to be predicted, the method may also consider whether to predict $c_1c_2$. If $c_1$ doesn't appear, the two possibilities are both equally bad. When $c_1$ appears, the string length may be $l_1$ and then $c_2$ may be predicted and the string length $l_2$ may be obtained as a reward. Given p as an estimate of the probability of predicting $c_2$ and being correct, the reward per action may be estimated by $$\frac{l_1 + pl_2}{2}.$$

If $c_1c_2$ may be predicted, the reward may be estimated by $p(l_1+l_2)$. Thus, the difference $$p(l_1 + l_2) - \frac{l_1 + pl_2}{2} \geq t_l$$

may then be used as a heuristic to check whether adding the composed category may improve prediction where the length of a category may also be taken into account.

If it may be determined at step 504 that a new category should not be composed, than processing is finished for generating a new category. Otherwise, copies of two categories may be concatenated at step 506 to compose a new category. At step 508, a category node representing the new category may be added to the network of categories. In an embodiment, a prediction edge may not be added to connect the category node to another category node until it may be decided to add a prediction edge to connect the category node to another category node when the prediction edges are updated.

Note that updates for category composition may also occur online, and may occur independently of the updates for prediction. Although updates for category composition can occur independently of the updates for prediction, those skilled in the art will appreciated that for finite data sets, category generation, depending on the method used, can occur before the learning of prediction weights begins.

Moreover, a post-filtering method may apply criteria in various embodiments after the candidate category has been added to the set of categories for prediction purposes. For example, a criterion, such as the number of times a category has been seen as target so far during training, and how well the category may be predicted or may predict, may be used to decide whether the category should be kept. A post filtering method may be executed periodically to lower its overhead. In an embodiment, the criterion of frequency may be applied as a post filter as follows: if the frequency of the category in question is below a threshold from the last time that post filtering was executed, the category may be removed.

Thus the present invention may efficiently learn by trying to improve its predictions over a stream of information input from a rich source such as available online text from such sources as news articles, web pages, and so forth. The system and method may begin predicting categories at the individual character level, and, the system and method may over time build larger and larger categories to predict and help predict categories. New categories are composed during iterations of learning episodes, and hundreds of thousands of recurring categories may be learned. Interestingly, while the learning may be unsupervised, the learning methods are driven by feedback.

As can be seen from the foregoing detailed description, the present invention provides an improved system and method for efficiently learning a network of categories using prediction. A learning engine may receive a stream of characters and incrementally segment the stream of characters beginning with individual characters into larger and larger categories. Advantageously, iterative episodes of prediction and learning of categories for large scale applications may result in hundreds of thousands of categories connected by millions of prediction edges. Such a system and method may support many applications for efficiently learning a network of categories using prediction. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising: by one or more computing devices:
    accessing a network of categories, wherein:
        each category from the network of categories comprises one or more characters, and is connected with zero or more other categories from the network of categories; and
        each connection between two categories from the network of categories is associated with a weight; and
    iteratively updating the network of categories using a stream of characters until all characters from the stream of characters are processed, wherein each iteration comprises:
        selecting, from the network of categories, a target category, wherein the one or more characters of the target category match a first segment of characters from the stream of characters that has not been matched during previous iterations;
        selecting, from the network of categories, one or more context categories, wherein the one or more characters of each context category match a second segment of characters from the stream of characters that is in proximity to the first segment of characters;
        selecting, from the network of categories, one or more candidate categories, wherein each candidate category is connected with at least one of the one or more context categories;
        for each candidate category of the one or more candidate categories, computing a first score using at least one weight associated with at least one connection between the candidate category and the at least one of the one or more context categories;
        selecting, from the one or more candidate categories, a highest-scoring candidate category;
        if the highest-scoring candidate category is not the target category, then for each context category of the one or more context categories,
            if there is a connection between the context category and the target category, then increasing the weight associated with the connection between the context category and the target category; and
            if there is no connection between the context category and the target category, then creating a connection with an initial weight between the context category and the target category.

2. The method of claim 1, wherein each iteration further comprises:
    if the highest-scoring candidate category is not the target category, then for each context category of the one or more context categories,
        selecting, from the network of categories, one or more first connections, wherein each first connection has a positional relationship with the target category that is same as the connection between the context category and the target category; and
        for each first connection of the one or more first connections,
            decreasing the weight associated with the first connection; and
            if the weight associated with the first connection is below a predetermined threshold, then removing, from the network of categories, the first connection.

3. The method of claim 1, wherein each iteration further comprises:
    if no category from the network of categories comprises one or more characters that match any segment of characters from the stream of characters that has not been matched during the previous iterations, then:
        creating a new category comprising one segment of characters from the stream of characters that has not been matched during the previous iterations;
        adding, to the network of categories, the new category; and
        selecting the new category as the target category for current iteration.

4. The method of claim 1, wherein during each iteration, the first segment of characters is the longest segment of characters from the stream of characters that has not been matched during previous iterations.

5. The method of claim 1, wherein:
    each category from the network of categories is associated with a rating; and
    each iteration further comprises for each context category of the one or more context categories, adjusting the rating associated with the context category based on whether the context category is informative in determining the highest-scoring candidate category as the target category.

6. The method of claim 1, further comprising for each category from the network of categories, maintaining a list of composition-candidate categories, an occurrence count, and a co-occurrence count.

7. The method of claim 6, wherein each iteration further comprises:
    selecting, from the one or more context categories, a first context categories, wherein the one or more characters of the first context category match the second segment of characters immediately before the first segment of characters from the stream of characters;
    for each composition-candidate category maintained for the first context category, incrementing the occurrence count associated with the composition-candidate category;

incrementing the co-occurrence count associated with the target category;
estimating a conditional probability for the first context category and the target category using the occurrence counts and the co-occurrence counts associated with the first context category and the target category;
if the conditional probability is above a predetermined threshold, then concatenating the first context category and the target category to form a single category in the network of categories, replacing the first context category and the target category.

8. A system comprising:
a memory comprising instructions executable by one or more processors; and
one or more processors coupled to the memory and operable to execute the instructions, the one or more processors being operable when executing the instructions to:
access a network of categories, wherein:
each category from the network of categories comprises one or more characters, and is connected with zero or more other categories from the network of categories; and
each connection between two categories from the network of categories is associated with a weight; and
iteratively update the network of categories using a stream of characters until all characters from the stream of characters are processed, wherein each iteration comprises:
select, from the network of categories, a target category, wherein the one or more characters of the target category match a first segment of characters from the stream of characters that has not been matched during previous iterations;
select, from the network of categories, one or more context categories, wherein the one or more characters of each context category match a second segment of characters from the stream of characters that is in proximity to the first segment of characters;
select, from the network of categories, one or more candidate categories, wherein each candidate category is connected with at least one of the one or more context categories;
for each candidate category of the one or more candidate categories, compute a first score using at least one weight associated with at least one connection between the candidate category and the at least one of the one or more context categories;
select, from the one or more candidate categories, a highest-scoring candidate category;
if the highest-scoring candidate category is not the target category, then for each context category of the one or more context categories,
if there is a connection between the context category and the target category, then increase the weight associated with the connection between the context category and the target category; and
if there is no connection between the context category and the target category, then create a connection with an initial weight between the context category and the target category.

9. The system of claim 8, wherein each iteration further comprises:
if the highest-scoring candidate category is not the target category, then for each context category of the one or more context categories,
select, from the network of categories, one or more first connections, wherein each first connection has a positional relationship with the target category that is same as the connection between the context category and the target category; and
for each first connection of the one or more first connections,
decrease the weight associated with the first connection; and
if the weight associated with the first connection is below a predetermined threshold, then remove, from the network of categories, the first connection.

10. The system of claim 8, wherein each iteration further comprises:
if no category from the network of categories comprises one or more characters that match any segment of characters from the stream of characters that has not been matched during the previous iterations, then:
create a new category comprising one segment of characters from the stream of characters that has not been matched during the previous iterations;
add, to the network of categories, the new category; and
select the new category as the target category for current iteration.

11. The system of claim 8, wherein during each iteration, the first segment of characters is the longest segment of characters from the stream of characters that has not been matched during previous iterations.

12. The system of claim 8, wherein:
each category from the network of categories is associated with a rating; and
each iteration further comprises for each context category of the one or more context categories, the apparatus further operable to adjust the rating associated with the context category based on whether the context category is informative in determining the highest-scoring candidate category as the target category.

13. The system of claim 8, wherein the one or more processors are further operable when executing the instructions to, for each category from the network of categories, maintain a list of composition-candidate categories, an occurrence count, and a co-occurrence count.

14. The system of claim 13, wherein each iteration further comprises:
select, from the one or more context categories, a first context categories, wherein the one or more characters of the first context category match the second segment of characters immediately before the first segment of characters from the stream of characters;
for each composition-candidate category maintained for the first context category, increment the occurrence count associated with the composition-candidate category;
increment the co-occurrence count associated with the target category;
estimate a conditional probability for the first context category and the target category using the occurrence counts and the co-occurrence counts associated with the first context category and the target category;
if the conditional probability is above a predetermined threshold, then concatenate the first context category and the target category to form a single category in the network of categories, replacing the first context category and the target category.

15. One or more computer-readable storage media embodying software operable when executed by one or more computer systems to:
- access a network of categories, wherein:
  - each category from the network of categories comprises one or more characters, and is connected with zero or more other categories from the network of categories; and
  - each connection between two categories from the network of categories is associated with a weight; and
- iteratively update the network of categories using a stream of characters until all characters from the stream of characters are processed, wherein each iteration comprises:
  - select, from the network of categories, a target category, wherein the one or more characters of the target category match a first segment of characters from the stream of characters that has not been matched during previous iterations;
  - select, from the network of categories, one or more context categories, wherein the one or more characters of each context category match a second segment of characters from the stream of characters that is in proximity to the first segment of characters;
  - select, from the network of categories, one or more candidate categories, wherein each candidate category is connected with at least one of the one or more context categories;
  - for each candidate category of the one or more candidate categories, compute a first score using at least one weight associated with at least one connection between the candidate category and the at least one of the one or more context categories;
  - select, from the one or more candidate categories, a highest-scoring candidate category;
  - if the highest-scoring candidate category is not the target category, then for each context category of the one or more context categories,
    - if there is a connection between the context category and the target category, then increase the weight associated with the connection between the context category and the target category; and
    - if there is no connection between the context category and the target category, then create a connection with an initial weight between the context category and the target category.

16. The media of claim 15, wherein each iteration further comprises:
- if the highest-scoring candidate category is not the target category, then for each context category of the one or more context categories,
  - select, from the network of categories, one or more first connections, wherein each first connection has a positional relationship with the target category that is same as the connection between the context category and the target category; and
  - for each first connection of the one or more first connections,
    - decrease the weight associated with the first connection; and
    - if the weight associated with the first connection is below a predetermined threshold, then remove, from the network of categories, the first connection.

17. The media of claim 15, wherein each iteration further comprises:
- if no category from the network of categories comprises one or more characters that match any segment of characters from the stream of characters that has not been matched during the previous iterations, then:
  - create a new category comprising one segment of characters from the stream of characters that has not been matched during the previous iterations;
  - add, to the network of categories, the new category; and
  - select the new category as the target category for current iteration.

18. The media of claim 15, wherein during each iteration, the first segment of characters is the longest segment of characters from the stream of characters that has not been matched during previous iterations.

19. The media of claim 15, wherein:
- each category from the network of categories is associated with a rating; and
- each iteration further comprises for each context category of the one or more context categories, the media further operable to adjust the rating associated with the context category based on whether the context category is informative in determining the highest-scoring candidate category as the target category.

20. The media of claim 15, wherein the software is further operable when executed by one or more computer systems to, for each category from the network of categories, maintain a list of composition-candidate categories, an occurrence count, and a co-occurrence count.

21. The media of claim 20, wherein each iteration further comprises:
- select, from the one or more context categories, a first context categories, wherein the one or more characters of the first context category match the second segment of characters immediately before the first segment of characters from the stream of characters;
- for each composition-candidate category maintained for the first context category, increment the occurrence count associated with the composition-candidate category;
- increment the co-occurrence count associated with the target category;
- estimate a conditional probability for the first context category and the target category using the occurrence counts and the co-occurrence counts associated with the first context category and the target category;
- if the conditional probability is above a predetermined threshold, then concatenate the first context category and the target category to form a single category in the network of categories, replacing the first context category and the target category.

* * * * *